Figure 1:
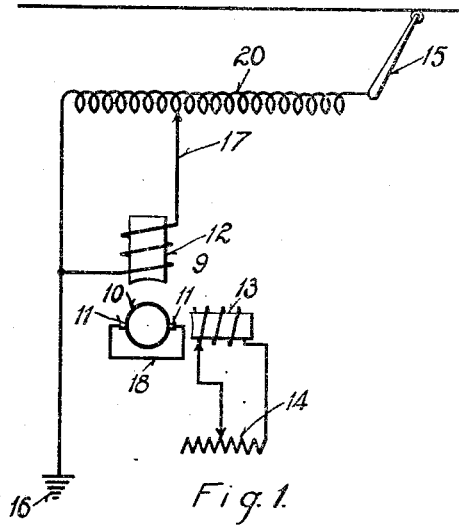

R. E. HELLMUND.
SYSTEM OF CONTROL FOR SINGLE PHASE MOTORS.
APPLICATION FILED APR. 23, 1915.

1,287,013.

Patented Dec. 10, 1918.
2 SHEETS—SHEET 1.

WITNESSES:
R. J. Fitzgerald.
D. C. Davis.

INVENTOR
Rudolf E. Hellmund.
BY
Wesley G. Carr
ATTORNEY

R. E. HELLMUND.
SYSTEM OF CONTROL FOR SINGLE PHASE MOTORS.
APPLICATION FILED APR. 23, 1915.
1,287,013.
Patented Dec. 10, 1918.
2 SHEETS—SHEET 2.
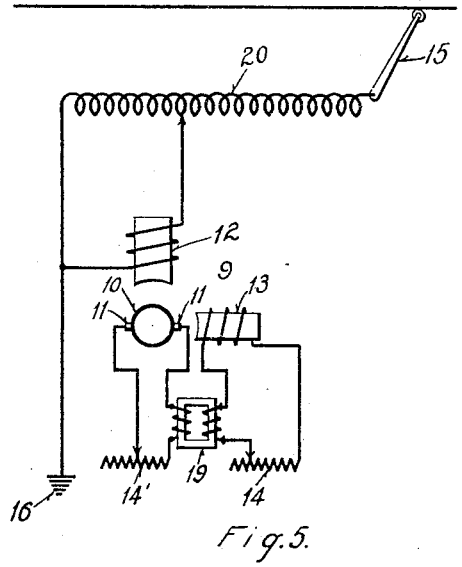
Fig. 5.
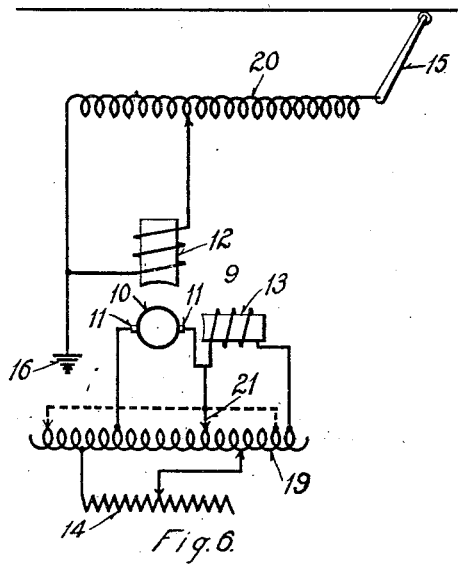
Fig. 6.
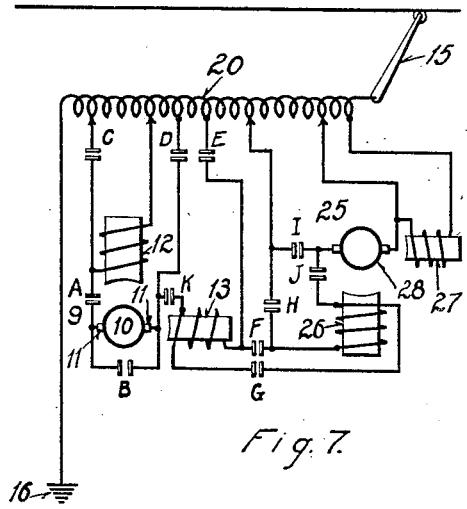
Fig. 7.
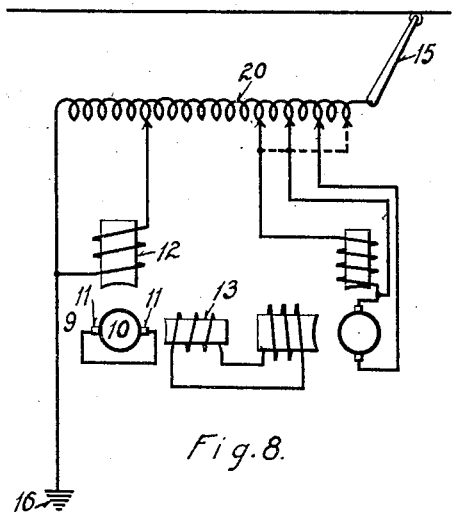
Fig. 8.
| Switch | A | B | C | D | E | F | G | H | I | J | K |
|---|---|---|---|---|---|---|---|---|---|---|---|
| Motor Operation | o | | | o | o | | | o | | o | o |
| Regenerating | | o | o | | | o | o | o | | | |
Fig. 9.
WITNESSES:
R. J. Fitzgerald
D. C. Davis
INVENTOR
Rudolf E. Hellmund.
BY
Wesley G. Carr
ATTORNEY

UNITED STATES PATENT OFFICE.

RUDOLF E. HELLMUND, OF PITTSBURGH, PENNSYLVANIA, ASSIGNOR TO WESTINGHOUSE ELECTRIC AND MANUFACTURING COMPANY, A CORPORATION OF PENNSYLVANIA.

SYSTEM OF CONTROL FOR SINGLE-PHASE MOTORS.

1,287,013.   Specification of Letters Patent.   Patented Dec. 10, 1918.

Application filed April 23, 1915. Serial No. 23,361.

*To all whom it may concern:*

Be it known that I, RUDOLF E. HELLMUND, a subject of the Emperor of Germany, and a resident of Pittsburgh, in the county of Allegheny and State of Pennsylvania, have invented a new and useful Improvement in Systems of Control for Single-Phase Motors, of which the following is a specification.

My invention relates to alternating-current dynamo-electric machines, especially of the commutator type, and it has for its object to provide a machine of the character specified that may be excited by alternating current of any desired frequency and which will deliver alternating current of like frequency to that of the exciting current but differing therefrom in voltage and in phase relation by any desired amount, at the same time maintaining good commutation throughout wide load variations.

Another object of my invention is to provide means whereby a plurality of machines of the character specified may operate in conjunction to carry a mechanical load subject to reversal and whereby, when said mechanical load reverses, one of said machines, or a separate exciting machine, will be connected to operate as a commutator generator to excite the field windings of the remaining machines, which, in turn, will operate as commutator generators to supply power to the line.

More specifically, my invention relates to systems of recuperative control for alternating-current motors of the commutator type, wherein a machine, normally used as a motor of the series or of the doubly-fed type, is used as an exciter machine for other associated motors of similar type during recuperation, said exciter machine being connected for repulsion operation during said recuperative operation.

By my invention, I am enabled to provide a current suitable for the excitation of series, commutating railway motors and like apparatus during the act of regeneration, as set forth in U. S. Patent No. 977,641, granted Dec. 6, 1910 to the Westinghouse Electric & Manufacturing Company upon an application filed by Benjamin G. Lamme, in a simple and effective manner.

I have illustrated my invention in the accompanying drawings in which Figure 1 is a diagrammatic view of a dynamo-electric machine arranged to operate as a phase converter; Figs. 2 to 6, inclusive, are diagrammatic views of modifications thereof; Figs. 7 and 8 illustrate the application of my invention to railway regeneration; and Fig. 9 is a sequence chart illustrating the switch operation in the circuit of Fig. 7.

Referring particularly to the form of my invention shown in Fig. 1, 9 is a dynamo-electric machine provided with an armature 10 having a commutator upon which bear brushes 11. A field winding 12 is provided to supply a main field that is displaced ninety electrical degrees from the plane of commutation indicated by the brushes 11; and a cross-field winding 13 is mounted in said plane of commutation for a purpose to be hereinafter set forth. A source of alternating current 20, such, for example, as the winding of an auto-transformer connected between a trolley 15 and the ground at 16, is arranged to supply energy to the main field winding 12 by means of an adjustable tap 17. The brushes 11 are short circuited upon each other externally of the armature winding by a wire 18.

Upon driving the armature 10 from any convenient prime mover, such, for example, as an engine, a car wheel, or an alternating-current motor of any suitable type supplied from the source 20, an electromotive force will be induced in the winding 13 by the currents set up in the armature 10 by the rotational electromotive force generated under the winding 12, said current circulating through the brushes 11—11 and the connection 18. With the connection shown, the electromotive force set up in the winding 13 will differ by substantially ninety degrees in phase from the current flowing in the winding 12. By moving either of the windings 12 and 13 about the axis of the armature 10 or by shifting the brushes 11 about said armature, the phase relation between the currents flowing in the windings 12 and 13 may be adjusted. Furthermore, by varying the ratio of the number of turns on the armature 10 and the number of turns in the winding 13, the voltage induced in the latter winding may be varied within wide limits, as there is a simple transformer relation between the armature winding and the winding 13. A load of any desired character, such as the field winding of another motor, is indicated at 14.

Figure 2:
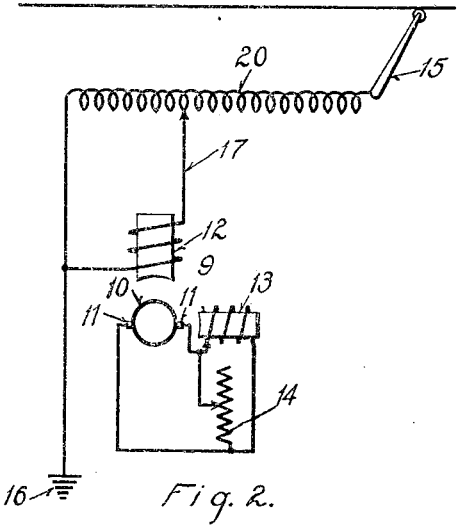

In the form of my invention shown in Fig. 2, I have shown the armature winding 10 and the cross-field winding 13 connected in series relation, with the load connected across the loop so that the two windings operate in parallel to supply energy thereto. By this arrangement and by varying the ratio of turns between the windings 10 and 13, any desired inducing field flux may be obtained, as dictated by the commutating conditions.

Figure 3:
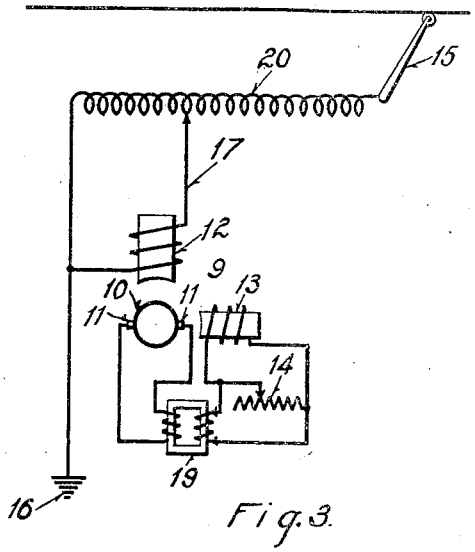

It frequently happens that it is desirable to change the ratio of transformation between the windings 10 and 13 after the machine is completed, and it would be extremely difficult and expensive to remodel the machine. I may therefore, as shown in Fig. 3, provide a small transformer 19 having its primary winding inserted in the connection between the brushes 11 and having its secondary winding operating in parallel with the winding 13 to supply current to the load 14. By properly adjusting the ratio of transformation of the transformer 19, any desired voltage may be applied to the load 14.

Figure 4:
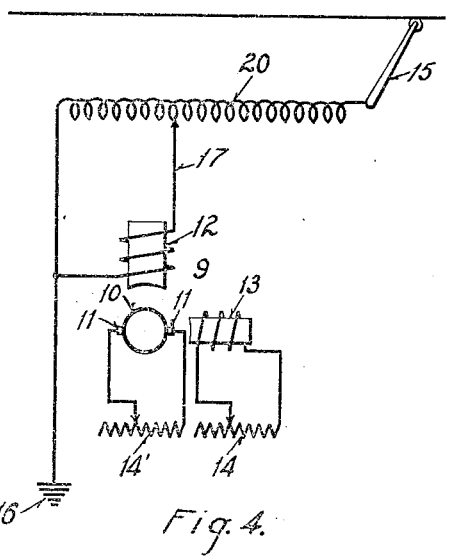

It is often the case that the voltage supplied to the load is immaterial, as for example, in electric braking, and, under these conditions, the load may be divided into two portions, as shown at 14 and 14' in Fig. 4, the portion 14 being supplied directly from the winding 19 and the portion 19' being supplied from the brushes 11. By varying the relative amounts of resistance and inductance in the loads 14 and 14', a proper commutating field may be provided for the brushes 11.

A still more flexible adjustment of the cross-field relations may be obtained by the arrangement shown in Fig. 5 wherein the two portions of the load 14 and 14' are not only supplied directly by the winding 13 and the armature 10, respectively, but the leads thereto are inductively interlinked by means of a transformer 19 so that the voltages generated in the armature 10 and the winding 13 and impressed upon the portions of the load 14' and 14 are combined vectorially with the voltages transmitted from one sub-circuit into the other sub-circuit through the transformer 19.

Another extremely flexible arrangement is shown in Fig. 6 wherein the armature winding 10, and the inducing winding 13 supply voltages to different portions of a transformer winding 19, and the intermediate connection 21 is adjustable throughout the entire range of the transformer winding so that the resultant ratio of transformation is determined by the fixed ratio between the windings 10 and 13 and the extremely flexible ratio provided by the taps on the transformer 19. For proper commutation at under-synchronous speeds, the tap 21 should be moved to the left-hand end of the transformer 19 and, as the speed increases, it should be moved to the right until, at maximum over-synchronous speed, it is at the extreme left-hand position. The load 14 may be connected across any desired portion of the auto-transformer 19.

In the application of my invention shown in Fig. 7, an auto-transformer 20, mounted on a railway vehicle and supplied with energy from a suitable trolley wire by means of a trolley 15, is electrically connected to two dynamo-electric machines 9 and 25 of the compensated commutating type. The machine 9 is provided with a main field winding 12, a cross field winding 13 and an armature 10, and is thus adapted to operate as a doubly-fed-commutating motor. The machine 25 is provided, in a similar manner, with a main field winding 26, a cross field winding 27 and an armature 28. Under normal conditions, the machines 9 and 25 are connected to operate as doubly-fed motors to propel the vehicle, suitable accelerating connections being provided by a control system (not shown). When operating in this manner, switches B, C, F, G and I are opened, and switches A, D, E, H, J and K are closed, as indicated in Fig. 9. Both machines are connected to the armature in accordance with the well known double-fed connection, whereby the main field winding, the armature winding and the cross field winding are all connected in series and where there is also a separate tap from the transformer to a point between the armature winding and the cross field winding so that the relative voltages impressed upon the armature and the cross field winding may be adjusted.

When it is desired to regenerate, the switches A, D, E, H, J and K are opened and the switches B, C, F, G and I are closed, as indicated in Fig. 9, whereupon the machine 9 operates as an exciter for the main field winding 26 of the machine 25. The E. M. F. generated in the cross field winding 13 of the machine 9 by induction from the short circuited armature thereof lags substantially ninety degrees behind the line voltage, as described in connection with Fig. 1, and is hence adapted to operate in a manner similar to that described in Patent No. 977,641 above referred to.

In detail, this operation is as follows: In the machine 9, the main field winding 12 is connected to be excited from the source 20 and to provide a field for the armature 10 which is caused to rotate by the car axle. The brushes of the armature 10 are short circuited through the switch B, and induced currents are thus allowed to circulate freely in the armature winding. These currents induce an electromotive force in the cross field winding 13, and said electromotive force may be varied in amount and phase as hitherto described. The current induced in the winding 13 flows through suitable switches F and G to the main field winding 26 of the machine 25. The machine 25 thereupon acts as a separately excited compensated commutator generator and feeds back power to the transformer 20.

The use of an alternating-current commutator motor in the manner thus described is highly advantageous for the following reasons. When operating as a motor, the doubly-fed connection produces the well-known advantages of flexible and effective control of the torque, speed and power-factor. When acting as an exciter machine for associated motors during recuperative operation thereof, it is desirable to eliminate as many supply leads as possible and it is therefore desirable to employ the short-circuited-armature or repulsion connection under these conditions. This is rendered possible by reason of the fact that, in a multi-motor railway installation, where the present system finds its widest field of application, the generating capacity of any one machine is far in excess of the demands for exciting current put thereupon by the remaining machines. Thus, the exciter machine may be operated at extremely low field strengths and, consequently, produces but extremely small sparking voltages over a very wide range of adjustment. The problem of commutation is, therefore, rendered extremely simple and it is unnecessary to resort to the doubly-fed or similar connections for the independent control of the inducing field strength within the wide limits of adjustment demanded.

Thus, by my system, I am enabled to employ a given dynamo-electric machine in the most advantageous manner, both during motor and recuperative operation and, moreover, the transfer from one type of operation to the other is effected by simple switching means.

Furthermore, it may be readily shown that, when a generator of the armature-short-circuited or repulsion type is operating on a load of low power-factor, the reactance sparking voltage subtracts from the short-circuit sparking voltage, thus still further simplifying the problem of commutation in the exciter machine and widening the range through which field adjustment may be effected without encountering commutation difficulties in said machine.

While I have shown a single motor supplying energy to the source, I may, if desired, use several motors, such, for example, as three of those on a four-motor car for power regeneration, using the remaining motor for exciting purposes, acting as does the exciter 9 as discussed in the foregoing Lamme patent. Furthermore, my invention is capable of further extension in that all the motors of a railway vehicle, if of the compensated commutating type, may be employed for power regeneration as commutator generators if supplied with exciting current of proper phase relation with respect to the line voltage.

It frequently happens that, with the connections shown in Fig. 7, the voltage of the cross field winding 27 is of such amount or of such phase relation that it does not properly compensate for the reactance and short-circuit voltages of the armature conductors of the armature 28 undergoing commutation. Under these conditions, I find that, by connecting both the winding 27 and the armature 28 to the source 20 and by suitably adjusting their connection taps therewith, as shown in Fig. 8, an effective regenerative action may be obtained and, at the same time, a resultant current may be obtained in the winding 27, both as to quantity and phase relation, to bring about proper commutation at the brushes of the armature 28.

The aforementioned property of the armature-short-circuited or repulsion type of generator, whereby the two principal sparking voltages tend to counteract each other when operating on a highly inductive load, permits the adjustment of the recuperating generator of the system of Fig. 8, throughout the doubly-fed, repulsion and reverse doubly-fed types of connections without commutating difficulties in the exciter machine.

Throughout the description of Figs. 7 and 8, I have laid emphasis on the generator operation of the machine 25, but advantages also flow from separately exciting the main field winding 26 with current from a source of quadrature voltage during motor operation, in that speed and power factor control may be obtained, together with good commutation over wide ranges of load and speed.

In the subjoined claims, I shall use the term "doubly-fed" in its broad sense as applying to a machine wherein a tap is made from an intermediate point in said machine to an adjustable point in the source, said point in the source lying between or beyond the main supply taps and even coinciding therewith, all as fully discussed in an article by J. V. Dobson and the applicant appearing on page 112 et seq. of the "*Electric Journal*" for March, 1916. I shall further employ the term "transformer conduction motor" in the appended claims, to refer to a motor in which the energy required by its armature—generally the rotor—is conveyed thereto by both conduction and electromagnetic induction. The above definition is given on page 1169 of the "*Proceedings of the American Institute of Electrical Engineers*" for July, 1916. A repulsion motor is thus excluded by the term "transformer conduction motor" as its armature energy is received solely by induction.

While I have shown my invention in several distinct modifications, it is obvious to those skilled in the art that it is susceptible of various additional minor changes and modifications without departing from the spirit thereof, and I desire, therefore, that no restrictions shall be placed thereupon except such as are imposed by the prior art or specifically set forth in the appended claims.

I claim as my invention:

1. In an alternating-current recuperative system, the combination with a source of alternating current, of a plurality of alternating-current machines of the commutator type, means for connecting said machines to said source for transformer conduction motor operation, means for, at times, supplying driving torque to each of said machines, means operable to connect the elements of one of said machines as a generator of the short-circuited-armature type and to supply the output thereof to the exciting field windings of the remaining machines when driving torque is being supplied to said machines, the doubly-fed connection of said remaining motors to said source being maintained, whereby said machines operate as doubly-fed generators in supplying energy to said source.

2. In an alternating-current recuperative system, the combination with a source of alternating current, of a plurality of alternating-current machines of the commutator type, means for connecting said machines to adjustable portions of said source for doubly-fed-motor operation, means for, at times, supplying driving torque to each of said motors, means operable to connect the elements of one of said motors as a generator of the short-circuited-armature type and to supply the output thereof to the exciting field windings of the remaining motors when driving torque is being supplied to said motors, the adjustable doubly-fed connection of said remaining motors being maintained, whereby said motors operate as doubly-fed generators, at widely adjustable voltages, in supplying energy to said source.

3. In an alternating-current recuperative system, the combination with a source of alternating current, of a plurality of alternating-current motors of the commutator type, means for connecting said motors to adjustable portions of said source for doubly-fed-motor operation, means for, at times, supplying driving torque to each of said motors, means operable to connect the elements of one of said motors as a generator of the short-circuited-armature type and to supply the output thereof to the exciting field windings of the remaining motors when driving torque is being supplied to said motors, the total load supplied by said exciting machine being largely inductive in nature, and the adjustable doubly-fed connection of said remaining motors being maintained, whereby said motors operate as doubly-fed generators, at widely adjustable voltages, in supplying energy to said source.

4. In an alternating-current recuperative system, the combination with a source of alternating current, of a plurality of alternating-current motors of the commutator type, means for connecting said motors to adjustable portions of said source for doubly-fed-motor operation, means for at times, supplying driving torque to each of said motors, means operable to connect the elements of one of said motors as a generator of the short-circuited-armature type and to supply the output thereof to the exciting field windings of the remaining motors when driving torque is being supplied to said motors, the adjustable connections of all of said machines to said source being maintained, whereby the excitation of said exciter machine may be widely varied to adjust the output electromotive force thereof and whereby the effective voltage of the source to be overcome by each of said recuperative generators may also be widely varied.

5. In an alternating-current recuperative system, the combination with a source of alternating current, of a plurality of alternating-current motors of the commutator type, means for connecting said motors to adjustable portions of said source for doubly-fed-motor operation, means for, at times, supplying driving torque to each of said motors, means operable to connect the elements of one of said motors as a generator of the short-circuited-armature type and to supply the output thereof to the exciting field windings of the remaining motors when driving torque is being supplied to said motors, the total load supplied by said exciting machine being largely inductive in nature, the adjustable connections of all of said machines to said source being maintained, whereby the excitation of said exciter machine may be widely varied to adjust the output electromotive force thereof and whereby the effective voltage of the source to be overcome by each of said recuperative generators may also be widely varied.

6. In an alternating-current recuperative system, the combination with a source of alternating current, of a plurality of alternating-current motors of the commutator type, means for connecting said motors to adjustable portions of said source for doubly-fed-motor operation, means for, at times, supplying driving torque to each of said motors, means operable to connect the elements of one of said motors as a generator of the short-circuited-armature type and to supply the output thereof to the exciting field windings of the remaining motors when driving torque is being supplied to said motors, the adjustable doubly-fed connection of said remaining motors being maintained, whereby said motors operate as doubly-fed generators, at widely adjustable voltages, in supplying energy to said source, the generating capacity of said exciting machine largely exceeding the current demands thereupon, whereby said exciting machine may be operated at very low flux densities.

7. In an alternating-current recuperative system, the combination with a source of alternating current, of a plurality of alternating-current motors of the commutator type, means for connecting said motors to adjustable portions of said source for doubly-fed-motor operation, means for, at times, supplying driving torque to each of said motors, means operable to connect the elements of one of said motors as a generator of the short-circuited-armature type and to supply the output thereof to the exciting field windings of the remaining motors when driving torque is being supplied to said motors, the total load supplied by said exciting machine being largely inductive in nature, and the adjustable doubly-fed connection of said remaining motors being maintained, whereby said motors operate as doubly-fed generators, at widely adjustable voltages, in supplying energy to said source, the generating capacity of said exciting machine largely exceeding the current demands thereupon, whereby said exciting machine may be operated at very low flux densities.

In testimony whereof I have hereunto subscribed my name this 14th day of April, 1915.

RUDOLF E. HELLMUND.

Copies of this patent may be obtained for five cents each, by addressing the "Commissioner of Patents, Washington, D. C."